May 13, 1924.

P. FRIEDLY 1,494,232

TESTING OUTFIT AND TOOL CASE

Filed Oct. 8, 1921    2 Sheets-Sheet 1

Paul Friedly
INVENTOR

BY

ATTORNEY

WITNESS:

Patented May 13, 1924.

1,494,232

UNITED STATES PATENT OFFICE.

PAUL FRIEDLY, OF CONVOY, OHIO.

TESTING OUTFIT AND TOOL CASE.

Application filed October 6, 1921. Serial No. 505,430.

*To all whom it may concern:*

Be it known that I, PAUL FRIEDLY, a citizen of the United States, residing at Convoy, in the county of Van Wert and State of Ohio, have invented new and useful Improvements in Testing Outfits and Tool Cases, of which the following is a specification.

This invention relates to electrical testing devices and has for its object the provision of a combination of electrical devices associated with a tool box or kit of the type commonly used on the running-boards of automobiles and the like, the structure and arrangement of the parts being such as to facilitate testing of the continuity of an electric circuit through conductors, the device being designed particularly for use in testing armature coils and the commutator sections associated therewith.

An important object is the provision of a testing device of this character which includes a peculiarly constructed hand engaged member having two contacts designed to engage adjacent sections of a commutator, the device however, not being limited for use in testing commutators as it may be used in association with a great variety of electrical devices, the adaptation readily suggesting itself to the mind of one skilled in the art.

An additional object is the provision of a device of this character which will be simple and inexpensive in manufacture, easy to use, efficient in service, durable, and a general improvement in the art.

With the above and other objects and advantages in view, the invention consists in the details of construction to be hereinafter more fully described and claimed and illustrated in the accompanying drawings in which Figure 1 is a perspective view of my testing outfit associated with a containing tool box.

Figure 1:
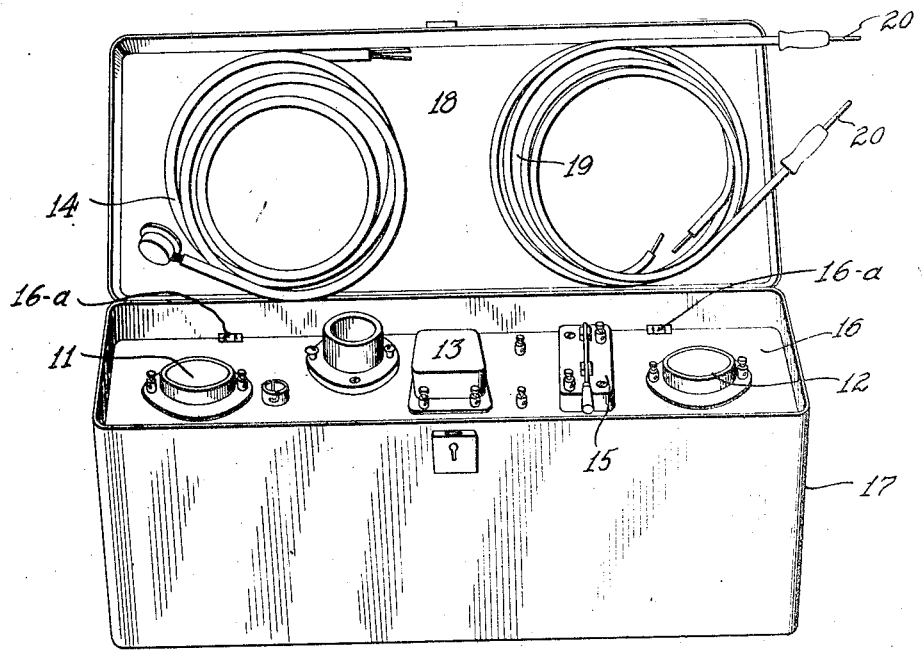

Referring more particularly to the drawings, I have shown my device as comprising a plurality of electrical testing instruments, namely, a suitable battery 10, a volt meter 11, an ammeter 12, a buzzer 13, a head engaging telephone receiver set 14, and a switch 15, all these instruments being mounted upon a suitable base 16 hingedly mounted at 16ª within a containing box 17 having the usual cover 18. The box 17 is of the type construction of stamped steel and used as the tool box of an automobile, such boxes being commonly secured upon the running board or other convenient location. The various instruments mentioned are of course provided with suitable terminals whereby proper connections may be made, as will be hereinafter described. It is of course apparent that I make use of suitable wires 19 having terminals 20 adapted to be connected with an armature or commutator to be tested, the wires also being naturally connected with the battery. The space below the base 16 may be used as a tool kit.

I furthermore make use of a terminal device comprising a block of insulation 21 through which extend metallic rods or wires 22 which preferably have curved ends 23 spaced apart and which are connected with other wires 24 adapted for connection with the volt meter, the buzzer, the ammeter, or the telephone receiver set, as may be preferred.

Figure 2:
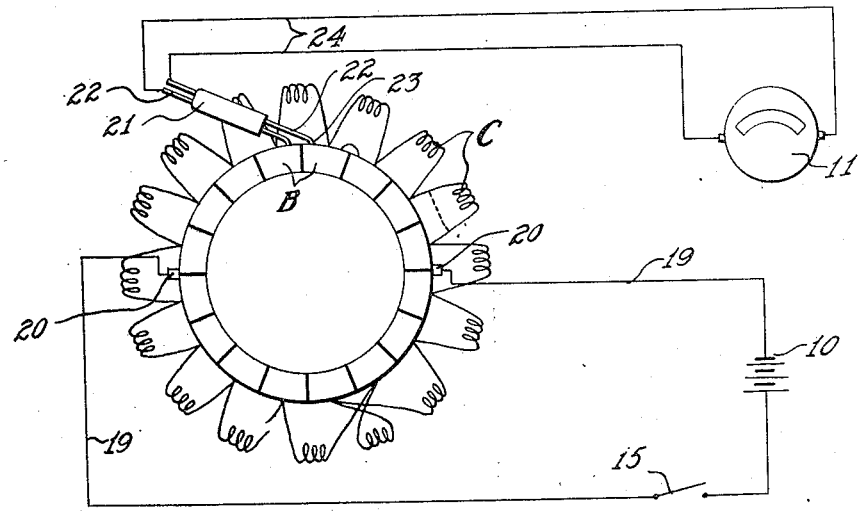
Figure 2 is a diagrammatic view illustrating the use of my device in testing armature coils and commutator sections.

In Figure 2 I have shown a diagram of the circuit when the apparatus is arranged for testing an armature and commutator. In such use the terminals 20 of the wires 19 which lead from the battery, are engaged against diametrically opposite points of the commutator A. The wires 24 are connected with the volt meter 11 and with the metallic elements 22 of the hand device. In carrying out the testing process, this hand device is so arranged that the ends 23 of the metallic elements 22 thereof will engage against adjacent sections B of the commutator. If the commutator sections are not short circuited and if the armature coils C connected therewith, have proper connections and have no breaks, the reading on the volt meter will be the same regardless of which pair of sections are engaged by the metallic members 22. If there should be a break in the armature coil connecting adjacent commutator sections there will be a zero reading on the volt meter. If two of the commutator sections are short circuited or if a coil is short circuited or grounded, the volt meter will show practically no deflection. If there is a poor connection between a section and the coil connecting two adjacent sections, there will be a large drop in the voltage whereas an open circuit caused by a break in the coil will be indicated by an absolute fall of the voltage.

Figure 3:
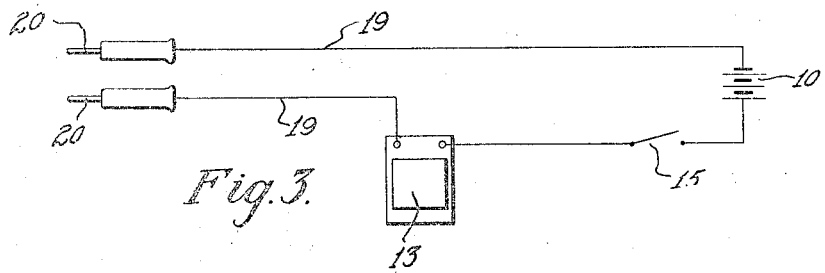
Figure 3 is a view showing a modified arrangement.

Instead of using the volt meter, as disclosed in Figure 2, I may make use of the buzzer 13 which must of course be interposed in the connection between one of the members 22 and the battery, this arrangement being shown in Figure 3.

Figure 4:
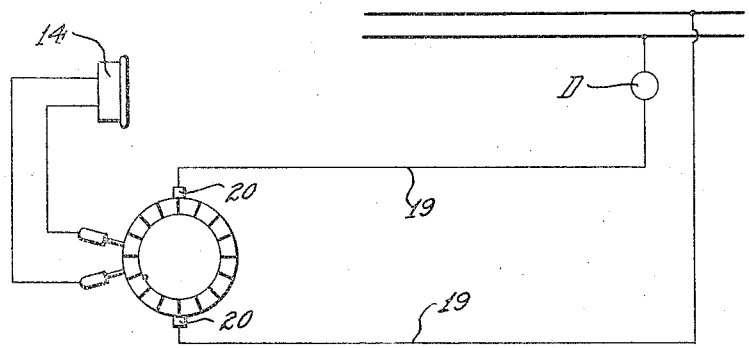
Figure 4 is a diagrammatic view showing a still further modification.

In Figure 4 I have shown my testing apparatus as utilizing the telephone receiver set 14 connected with the contact members 22 in place of the volt meter and having also shown the source of current as being a power line having an incandescent lamp D or other suitable resistance interposed in the circuit between this power line and the contacts 20.

Figure 5:
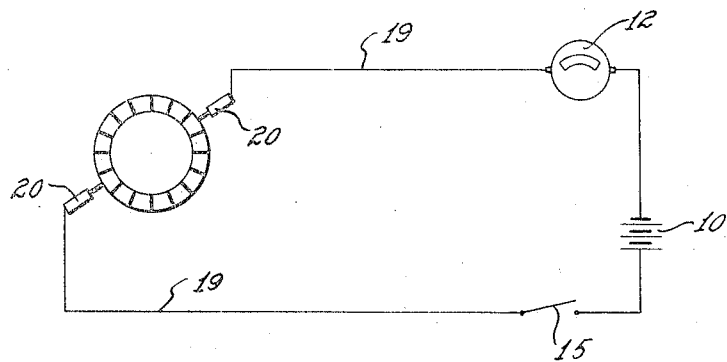
Figure 5 is a view of another modification.

If preferred, I may make use of the arrangement shown in Figure 5, which discloses the use of the ammeter 12 taking the place of the buzzer shown in Figure 3.

In all forms of the device it will be seen that the operation is substantially the same, the defects in the circuit being evidenced by either drop in voltage, sounding of the buzzer, clicking in the telephone receiver set, or variation in the readings of the ammeter. Regardless of which form of the apparatus is used it will be apparent that the arrangement of the parts is simple and that the changes from one form of testing instrument to another may be readily effected and that the test may be carried out by a comparatively unskilled workman.

While I have shown and described the preferred embodiments of my invention, it is of course to be understood that I reserve the right to make such changes in the form, construction and arrangement of parts as will not depart from the spirit of the invention or the scope of the subjoined claim.

What is claimed is:—

In a testing apparatus, a contact device comprising an elongated supporting handle of insulating material, and a pair of metallic contact elements secured therein, extending therethrough and projecting beyond the ends thereof, the contact members projecting beyond one end being of unequal lengths whereby to be engageable upon adjacent sections of a commutator in testing.

In testimony whereof I affix my signature.

PAUL FRIEDLY.